(12) United States Patent
Lee

(10) Patent No.: US 10,394,735 B2
(45) Date of Patent: Aug. 27, 2019

(54) COMPARATIVE FORWARDING CIRCUIT PROVIDING FIRST DATUM AND SECOND DATUM TO ONE OF FIRST CIRCUIT AND SECOND CIRCUIT ACCORDING TO TARGET ADDRESS

(71) Applicant: NANYA TECHNOLOGY CORPORATION, Taoyuan (TW)

(72) Inventor: Wen Ming Lee, Toufen (TW)

(73) Assignee: Nanya Technology Corporation, Taoyuan (TW)

( * ) Notice: Subject to any disclaimer, the term of this patent is extended or adjusted under 35 U.S.C. 154(b) by 395 days.

(21) Appl. No.: 15/401,477

(22) Filed: Jan. 9, 2017

(65) Prior Publication Data

US 2018/0196769 A1 Jul. 12, 2018

(51) Int. Cl.
*G06F 13/36* (2006.01)
*G06F 13/40* (2006.01)

(52) U.S. Cl.
CPC .......... *G06F 13/36* (2013.01); *G06F 13/4068* (2013.01)

(58) Field of Classification Search
CPC .............................. G06F 13/36; G06F 13/4068
See application file for complete search history.

(56) References Cited

U.S. PATENT DOCUMENTS

| 4,377,843 A | 3/1983 | Garringer et al. |
| 5,737,256 A | 4/1998 | Nakagawa et al. |
| 7,990,990 B2* | 8/2011 | Chen .................... G11C 7/1012 370/412 |
| 8,982,609 B2* | 3/2015 | Yang .................... G11C 11/419 365/154 |
| 9,665,540 B2* | 5/2017 | Symes .................. G06F 17/147 |

FOREIGN PATENT DOCUMENTS

CN 203299644 U 11/2013

* cited by examiner

*Primary Examiner* — Tammara R Peyton
(74) *Attorney, Agent, or Firm* — Muncy, Geissler, Olds & Lowe, P.C.

(57) ABSTRACT

A circuitry includes a source circuit; a first circuit; a second circuit; and a data-distributing circuit including: a receiving circuit configured to receive a first datum for the first circuit via a first and second front line, and to receive from the source circuit a second datum for the second circuit via a third front line and a fourth front line; and a forwarding circuit configured to receive one of the first datum and the second datum via a first intermediate line and a second intermediate line, to receive a target address associated with the one of the first datum and the second datum via a third intermediate line, and, according to the target address, provide the one of the first datum and the second datum to one of the first circuit and the second circuit.

19 Claims, 8 Drawing Sheets

US 10,394,735 B2

COMPARATIVE FORWARDING CIRCUIT PROVIDING FIRST DATUM AND SECOND DATUM TO ONE OF FIRST CIRCUIT AND SECOND CIRCUIT ACCORDING TO TARGET ADDRESS

TECHNICAL FIELD

The present disclosure relates to circuits, and more particularly, to a circuit communicating with two or more other circuits.

DISCUSSION OF THE BACKGROUND

Semiconductor integrated circuit (IC) technology has undergone rapid progress including the continued minimization of feature size and the maximization of packing density. The minimization of feature size is dependent on improvements in photolithography and its ability to print smaller features or critical dimensions (CD). An integrated circuit may include a plurality of circuits. The circuits are coupled to each other via a conductive line.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY

One aspect of the present disclosure provides a circuitry. The circuitry includes a source circuit, a first circuit, a second circuit and a data-distributing circuit. The data-distributing circuit includes: a receiving circuit configured to receive from the source circuit a first datum for the first circuit via a first front line and a second front line, and to receive from the source circuit a second datum for the second circuit via a third front line and a fourth front line; and a forwarding circuit configured to receive one of the first datum and the second datum via a first intermediate line and a second intermediate line, to receive a target address associated with the one of the first datum and the second datum via a third intermediate line, and, according to the target address, to provide the one of the first datum and the second datum to one of the first circuit and the second circuit.

In some embodiments, the forwarding circuit configured to provide the one of the first datum and the second datum to the one of the first circuit and the second circuit further comprises: the forwarding circuit configured to either provide the first datum to the first circuit via a first back line and a second back line, or provide the second datum to the second circuit via a third back line and a fourth back line.

In some embodiments, the forwarding circuit includes a first latch configured to provide the first datum to the first circuit when the target address is identical to a first address of the first circuit; and includes a second latch configured to provide the second datum to the second circuit when the target address is identical to a second address of the second circuit.

In some embodiments, when the target address is identical to the first address, then the first latch is configured to provide the first datum to the first circuit via the first back line and the second back line. When the target address is identical to the second address, then the second latch is configured to provide the second datum to the second circuit via the third back line and the fourth back line.

In some embodiments, both the first latch and the second latch receive the one of the first datum and the second datum via the first intermediate line and the second intermediate line.

In some embodiments, both the first latch and the second latch receive the target address via the third intermediate line.

In some embodiments, the receiving circuit includes: a first determination circuit configured to provide the first datum and the first address serving as the target address to the forwarding circuit when the first datum is updated; and a second determination circuit configured to provide the second datum and the second address serving as the target address to the forwarding circuit when the second datum is updated.

In some embodiments, the first determination circuit is further configured to determine whether the first datum is updated by comparing the first datum and a first early datum, wherein the first early datum is received earlier than the first datum. The second determination circuit is configured to determine whether the second datum is updated by comparing a second early datum with the second datum, wherein the second early datum is received earlier than the second datum.

In some embodiments, the first determination circuit includes: a first exclusive-or (XOR) logic gate coupled to the first front line and the second front line for receiving the first datum, and coupled to a first inner line and a second inner line for receiving the first early datum; a first multiplexer (MUX) coupled to an output of the first XOR logic gate at the first MUX's controlled terminal and coupled to the third intermediate line at the first MUX's output, and configured to receive the first address; and a second MUX coupled to the output of the first XOR logic gate at the second MUX's controlled terminal, coupled to the first front line and the second front line at the second MUX's first and second inputs respectively, and coupled to the first intermediate line and the second intermediate line at the second MUX's first and second outputs respectively.

In some embodiments, the second determination circuit includes: a second exclusive-or (XOR) logic gate coupled to the third front line and the fourth front line for receiving the second datum, and coupled to a third inner line and a fourth inner line for receiving the second early datum; a third MUX coupled to an output of the second XOR logic gate at the third MUX's controlled terminal and coupled to the third intermediate line at the third MUX's output, and configured to receive the second address; and a fourth MUX coupled to the output of the second XOR logic gate at the fourth MUX's controlled terminal, coupled to the third front line and the fourth front line at the fourth MUX's first and second inputs respectively, and coupled to the first intermediate line and the second intermediate line at the fourth MUX's first and second outputs respectively.

Another aspect of the present disclosure provides a circuitry. The circuitry includes a source circuit; a first circuit; a second circuit; and a data-distributing circuit. The data-distributing circuit includes: a receiving circuit configured to receive from the source circuit a first datum for the first circuit via a first front line and a second front line, receive from the source circuit a second datum for the second circuit via a third front line and a fourth front line, connect the first front line and the second front line to a first intermediate line and a second intermediate line respectively when the first datum is updated, and connect the third front line and the fourth front line to the first and second intermediate lines respectively when the second datum is updated; and a forwarding circuit configured to receive, via the first intermediate line and the second intermediate line, the first datum when the first front line and the second front line are connected to the first and second intermediate lines respectively, and receive, via the first intermediate line and the second intermediate line, the second datum when the third front line and the fourth front line are connected to the first and second intermediate lines respectively.

In some embodiments, the forwarding circuit is further configured to receive, via a third intermediate line between the receiving circuit and the forwarding circuit, a target address, wherein the target address is a first address of the first circuit when the first datum is updated, and the target address is a second address of the second circuit when the second datum is updated.

In some embodiments, the forwarding circuit is further configured to, according to the first address, provide the first datum to the first circuit, and configured to, according to the second address, provide the second datum to the second circuit.

In some embodiments, the forwarding circuit is configured to provide the first datum to the first circuit via a first back line and a second back line, and provide the second datum to the second circuit via a third back line and a fourth back line.

In some embodiments, the forwarding circuit includes: a first latch configured to store the first address of the first circuit, and provide the first datum to the first circuit when the target address is identical to the first address; and a second latch configured to store the second address of the second circuit, and provide the second datum to the second circuit when the target address is identical to the second address.

In some embodiments, both the first latch and the second latch receive the one of the first datum and the second datum via the first intermediate line and the second intermediate line.

In some embodiments, both the first latch and the second latch receive the target address via the third intermediate line.

In some embodiments, the receiving circuit includes a first determination circuit configured to provide the first datum and the first address serving as the target address to the forwarding circuit when the first datum is updated; and a second determination circuit configured to provide the second datum and the second address serving as the target address to the forwarding circuit when the second datum is updated.

In some embodiments, the first determination circuit is further configured to determine whether the first datum is updated by comparing the first datum and a first early datum, wherein the first early datum is received earlier than the first datum. The second determination circuit is further configured to determine whether the second datum is updated by comparing the second datum and a second early datum, wherein the second early datum is received earlier than the second datum.

Another aspect of the present disclosure provides a circuitry. The circuitry includes a first source circuit; a second source circuit; a first circuit; a second circuit; a first receiving circuit configured to receive from the first source circuit a first datum for the second source circuit via a first front line and a second front line, and to receive from the first source circuit a second datum for the second circuit via a third front line and a fourth front line; a first repeater configured to, in response to a first trigger signal, receive one of the first datum and the second datum from the first receiving circuit via a first intermediate line and a second intermediate line; a first latch configured to, in response to the first trigger signal, receive the one of the first datum and the second datum from the first repeater via a fifth intermediate line and a sixth intermediate line; a second latch configured to, in response to the first trigger signal, receive the one of the first datum and the second datum from the first repeater via the fifth intermediate line and the sixth intermediate line; a second receiving circuit configured to receive from the second source circuit a third datum for the first source circuit via a first back line and a second back line, and receive from the second source circuit a fourth datum for the first circuit via a third back line and a fourth back line; a second repeater configured to, in response to a second trigger signal different from the first trigger signal, receive one of the third datum and the fourth datum from the second receiving circuit via the fifth intermediate line and the sixth intermediate line; a third latch configured to, in response to the second trigger signal, receive the one of the third datum and the fourth datum from the second repeater via the first intermediate line and the second intermediate line; and a fourth latch configured to, in response to the second trigger signal, receive the one of the third datum and the fourth datum from the second repeater via the first intermediate line and the second intermediate line.

Another aspect of the present disclosure provides a communication method. The communication method includes the following operations. In an operation, a first datum for a first circuit is received via a first front line and a second front line. Moreover, a second datum for a second circuit is received via a third front line and a fourth front line. In another operation, it is determined whether the first datum is updated by comparing the first datum with a first early datum. The first early datum is received earlier than the first datum. Moreover, it is determined whether the second datum is updated by comparing the second datum with a second early datum. The second early datum is received earlier than the second datum.

In an embodiment, if the first datum is determined as being updated, the first datum is transmitted via a first intermediate line and a second intermediate line, and a first address which serves as the target address is transmitted via a third intermediate line. Then, according to the target address, the first datum is provided to the first circuit via a first back line and a second back line.

In an embodiment, if the second datum is determined as being updated, the second datum is transmitted via the first intermediate line and the second intermediate line, and a second address which serves as the target address is transmitted via the third intermediate line. Then, according to the target address, the second datum is provided to the second circuit via a third back line and a fourth back line.

Under the prior technology, a circuit designed to communicate with other circuits requires an excessive number of conductive lines. The present disclosure resolves such disadvantage of the prior art by using the data-distributing circuit to reduce the number of conductive lines. Moreover, the number of conductive lines reduced by the present disclosure is greater for circuits that communicate with greater numbers of other circuits. For example, a source circuit that communicates with two other circuits would require at least one fewer conductive line under the present disclosure than would be required under the prior technology.

A reduction in the number of conductive lines creates additional space between neighboring conductive lines, and signal interference between such neighboring conductive lines is accordingly reduced. Additionally, with the reduced number of conductive lines, size requirements of integrated circuits are reduced as well. Alternatively, an integrated circuit with a particular area can accommodate more circuits under the present disclosure. In an embodiment in which the first datum and/or the second datum requires at least two bits representing a bit string (and therefore at least two state lines) to represent the content of the first datum and/or the second datum, the number of conductive lines is significantly reduced.

The foregoing has outlined rather broadly the features and technical advantages of the present disclosure in order that the detailed description of the disclosure that follows may be better understood. Additional features and advantages of the disclosure are described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
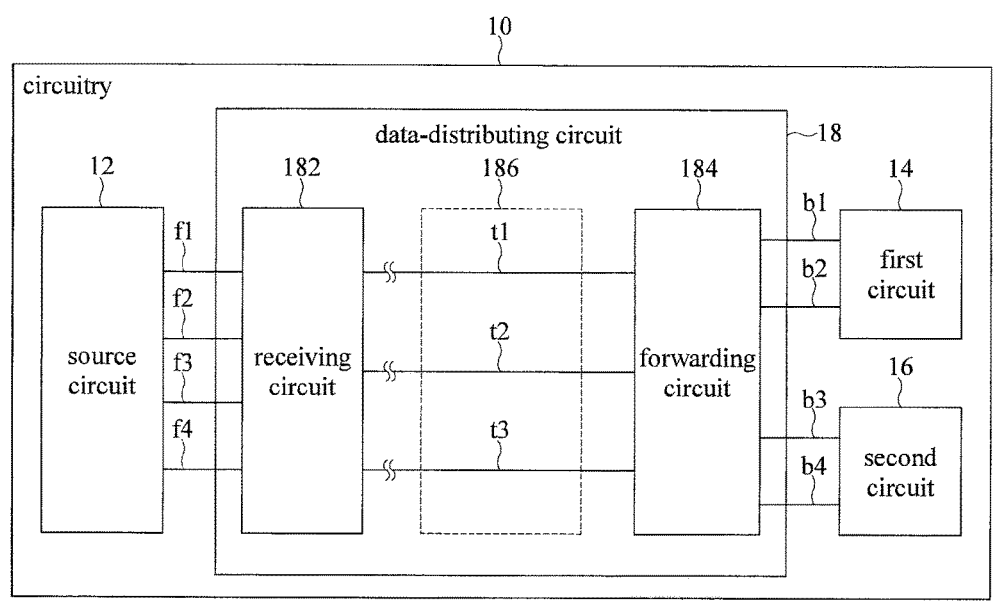
FIG. 1 is a layout diagram of a circuitry including a data-distributing circuit in accordance with some embodiments of the present disclosure.

Embodiments, or examples, of the disclosure illustrated in the drawings are now described using specific language. It shall nevertheless be understood that no limitation of the scope of the disclosure is thereby intended. Any alterations or modifications in the described embodiments, and any further applications of principles described in this document, are to be considered as normally occurring to one of ordinary skill in the art to which the disclosure relates. Reference numerals may be repeated throughout the embodiments, but this does not necessarily require that feature(s) of one embodiment apply to another embodiment, even if they share the same reference numeral.

It shall be understood that when an element is referred to as being "connected to" or "coupled with" another element, it may be directly connected to or coupled to the other element, or intervening elements may be present.

It shall be understood that, although the terms first, second, third, etc. may be used herein to describe various elements, components, regions, layers and/or sections, these elements, components, regions, layers and/or sections should not be limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It shall be further understood that the terms "comprises" and "comprising," when used in this specification, specify the presence of stated features, integers, steps, operations, elements, and/or components, but do not preclude the presence or addition of one or more other features, integers, steps, operations, elements, components, or groups thereof.

FIG. 1 is a layout diagram of a circuitry 10 including a data-distributing circuit 18 in accordance with some embodiments of the present disclosure. Referring to FIG. 1, the circuitry 10 includes a source circuit 12, a first circuit 14 and a second circuit 16 in addition to the data-distributing circuit 18. Each of the first circuit 14 and the second circuit 16 may be analog circuits, digital circuits or a combination thereof. The source circuit 12 functions to transmit a first datum for the first circuit 14 and a second datum for the second circuit 16 via four conductive lines, a first front line f1, a second front line f2, a third front line f3, and a fourth front line f4.

The first front line f1, the second front line f2, the third front line f3, and the fourth front line f4 function to carry data. In the present embodiment, the first datum for the first circuit 14 is transmitted from the source circuit 12 by two conductive lines. However, the present disclosure is not limited to two conductive lines. The number of conductive lines for transmitting the first datum of the first circuit 14 depends on the content of the first datum. If two bits, such as 00, 01, 10 and 11, are sufficient to represent the first datum, then two conductive lines are enough. However, if the first datum requires three bits to represent the content thereof, then three conductive lines are required. For similar reasons, the number of conductive lines for transmitting the second datum of the second circuit 16 depends on the content of the second datum.

The data-distributing circuit 18 includes a receiving circuit 182 and a forwarding circuit 184. The receiving circuit 182 is communicatively coupled to the forwarding circuit 184 via a first intermediate line t1, a second intermediate line t2 and a third intermediate line t3, all of which are conductive lines. The first intermediate line t1 and the second intermediate line t2 function to carry data. As such, the first intermediate line t1 and the second intermediate line t2 can be called a state line. From another perspective, the carried data is characterized by a waveform composed of a logically high state or a logically low state. As such, the first intermediate line t1 and the second intermediate line t2 can also be called a state line. The third intermediate line t3 functions to carry an address that indicates where the data is transmitted. As such, the third intermediate line t3 can be called an address line. In the present embodiment, the address is transmitted by one conductive line. However, the present disclosure is not limited to one address line. The number of address lines depends on the number of circuits which communicate with the source circuit 12. Because in the present disclosure there are two circuits which communicate with the source circuit 12 and one bit, such as 0 or 1, is sufficient to indicate an address of each of the circuits, one address line is sufficient.

The receiving circuit 182 receives from the source circuit 12 the first datum for the first circuit 14 via the first front line f1 and the second front line f2, and receives from the source circuit 12 the second datum for the second circuit 16 via the third front line f3 and the fourth front line f4. In an embodiment, the receiving circuit 182 connects the first front line f1 and the second front line f2 to the first intermediate line t1 and the second intermediate line t2 respectively when the first datum is updated. Alternatively, the receiving circuit 182 connects the third front line f3 and the fourth front line f4 to the first intermediate line t1 and the second intermediate line t2 respectively when the second datum is updated. The updated operation will be described in detail below.

The forwarding circuit 184 receives one of the first datum and the second datum via the first intermediate line t1 and the second intermediate line t2, and receives a target address associated with the one of the first datum and the second datum via the third intermediate line t3. In an embodiment, the forwarding circuit 184 can receive only one datum during a single transmission. Moreover, the forwarding circuit 184 provides, according to the target address, the one of the first datum and the second datum to one of the first circuit 14 and the second circuit 16. The target address is a first address of the first circuit 14 when the first datum is updated, and the target address is a second address of the second circuit 16 when the second datum is updated.

In an embodiment, the forwarding circuit 184 receives, via the first intermediate line t1 and the second intermediate line t2, the first datum when the first front line f1 and the second front line f2 are connected to the first intermediate line t1 and the second intermediate line t2 respectively. Alternatively, the forwarding circuit 184 receives, via the first intermediate line t1 and the second intermediate line t2, the second datum when the third front line f3 and the fourth front line f4 are connected to the first intermediate line t1 and the second intermediate line t2 respectively.

Additionally, the forwarding circuit 184 either provides the first datum via a first back line b1 and a second back line b2 to the first circuit 14, or provides the second datum to the second circuit 16 via a third back line b3 and a fourth back line b4. The forwarding circuit 184 provides, according to the first address, the first datum to the first circuit 14. Alternatively, the forwarding circuit 184 provides, according to the second address, the second datum to the second circuit 16.

Under the prior technology, a circuit designed to communicate with other circuits requires an excessive number of conductive lines. The present disclosure resolves such disadvantage of the prior art by using the data-distributing circuit to reduce the number of conductive lines. To illustrate, in the present embodiment, as shown in FIG. 1, an area 186 of the layout diagram of the circuitry 10 between the source circuit 12 and both the first circuit 14 and the second circuit 16 is occupied by three conductive lines: the first intermediate line t1, the second intermediate line t2, and the third intermediate line t3. Furthermore, the number of conductive lines reduced by the present disclosure is greater for circuits that communicate with greater numbers of other circuits. For example, with the data-distributing circuit 18 of the present disclosure, a source circuit (such as the source circuit 12) that communicates with two circuits (such as the first circuit 14 and the second circuit 16) would require one fewer conductive line under the present disclosure than would be required under the prior technology, which will be discussed in detail with reference to FIG. 2. In other words, the space-saving benefits of the present disclosure rise proportionally with the number of circuits the source circuit communicates with.

A reduction in the number of conductive lines creates additional space between neighboring conductive lines, and signal interference between such neighboring conductive lines is accordingly reduced. Additionally, with the reduced number of conductive lines, size requirements of integrated circuits are reduced as well. Alternatively, an integrated circuit with a particular area can accommodate more circuits under the present disclosure. In an embodiment in which the first datum and/or the second datum requires at least two bits representing a bit string (and therefore at least two state lines), the number of conductive lines is significantly reduced. Moreover, the circuitry 10 of the present disclosure can be applied to a circuit design of a memory, such as a dynamic random access memory (DRAM) or a static random-access memory. When a circuit (i.e., the source circuit 12) is designed to communicate with two circuits (i.e., the first circuit 14 and the second circuit 16), the data-distributing circuit 18 can be inserted therebetween for the sake of reduction of the lines as discussed above.

Figure 2:
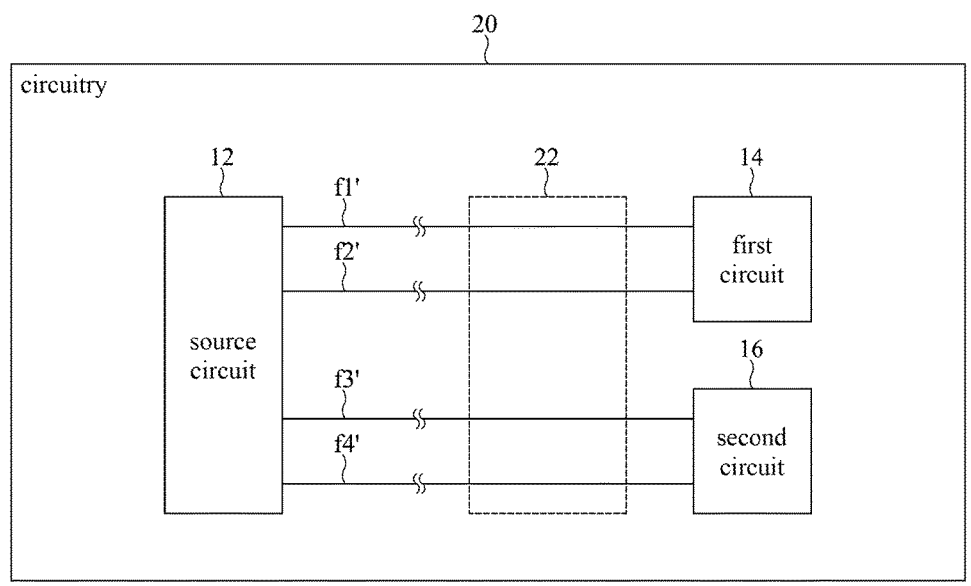
FIG. 2 is a layout diagram of a comparative circuitry.

FIG. 2 is a layout diagram of a comparative circuitry 20. Referring to FIG. 2, the comparative circuitry 20 is similar to the circuitry 10 described and illustrated with reference to FIG. 1 except that, for example, the comparative circuitry 20 omits the data-distributing circuit 18 of the present disclosure. The source circuit 12 directly communicates, via four conductive lines f1', f2', f3' and f4', with the first circuit 20 and the second circuit 16 without any circuits therebetween. As shown in FIG. 2, an area 22 of the layout diagram of the circuitry 20 between the source circuit 12 and both the first circuit 14 and the second circuit 16 is occupied by four conductive lines f1', f2', f3' and f4'. In contrast, the present disclosure requires only three conductive lines for a similar application. This illustrates how the data-distributing circuit of the present disclosure provides a reduction in size of the integrated circuit.

Figure 3:
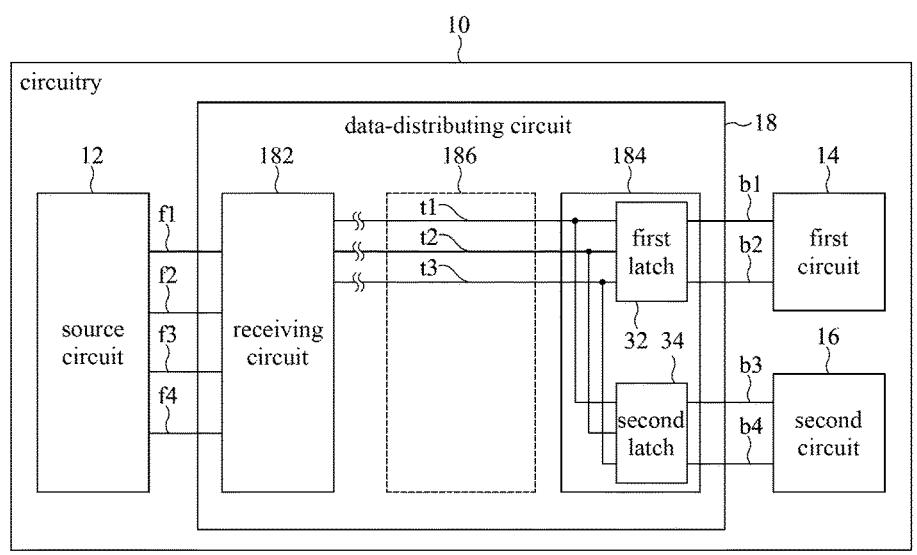
FIG. 3 is a layout diagram of a circuitry including the forwarding circuit in FIG. 1 in accordance with some embodiments of the present disclosure.

FIG. 3 is a layout diagram of the circuitry 10 including the forwarding circuit 184 shown in FIG. 1 in accordance with some embodiments of the present disclosure. Referring to FIG. 1, the forwarding circuit 184 includes a first latch 32 and a second latch 34. Both the first latch 32 and the second latch 34 receive the one of the first datum and the second datum via the first intermediate line t1 and the second intermediate line t2. Moreover, both the first latch 32 and the second latch 34 receive the target address via the third intermediate line t3.

The first latch 32 stores a first address of the first circuit 14, and provides the first datum, via the first back line b1 and the second back line b2, to the first circuit 14 when the target address is identical to the first address. When the target address received by the first latch 32 is different from the first address stored by the first latch 32, the first latch 32 blocks a datum received by the first latch 32 and does not provide the datum to the first circuit 14. For example, if a value of 1 representing the target address is different from a value of 0 representing the first address, then the first latch 32 does not provide the datum to the first circuit 14. In an embodiment, the first latch can be one of an SR latch and a D latch.

The second latch 34 stores a second address of the second circuit 16, and provides the second datum, via the third back line b3 and the fourth back line b4, to the second circuit 16 when the target address is identical to the second address. When the target address received by the second latch 34 is different from the second address stored by the second latch 34, the second latch 34 blocks a datum received by itself and the second latch 34 does not provide the datum to the second circuit 16. For example, if a value of 0 representing the target address is different from a value of 1 representing the second address, then the second latch 34 does not provide the datum to the second circuit 16. In an embodiment, the first latch can be one of an SR latch and a D latch.

Under the present disclosure, with the data-distributing circuit, the number of conductive lines in a transmission path between the circuit and the two or more circuits can be significantly reduced. Moreover, signal interference between two neighboring conductive lines is alleviated. Additionally, the size requirement of an integrated circuit can be reduced. Alternatively, in an integrated circuit of a given size, the integrated circuit can accommodate more circuits.

Figure 4:
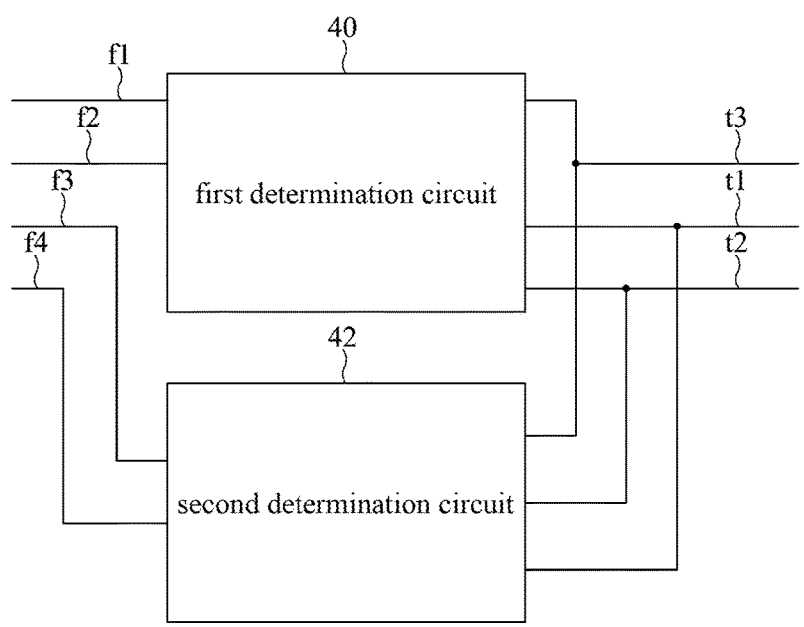
FIG. 4 is a block diagram of the receiving circuit in FIG. 1 in accordance with some embodiments of the present disclosure.

FIG. 4 is a block diagram of the receiving circuit 182 in FIG. 1 in accordance with some embodiments of the present disclosure. Referring to FIG. 4, the receiving circuit 182 includes a first determination circuit 40 and a second determination circuit 42.

The first determination circuit 40 provides the first datum via the first intermediate line t1 and the second intermediate line t2, and provides the first address serving as the target address via the third intermediate line t3 to the forwarding circuit 184 when the first datum is updated. Moreover, the first determination circuit 40 determines whether the first datum is updated by comparing the first datum and a first early datum. The first early datum is received earlier than the first datum. For example, the first determination circuit 40 receives the first datum at a second timing T2, and receives the first early datum at a first timing T1. The first timing T1 is earlier than the second timing T2.

The second determination circuit 42 provides the second datum via the first intermediate line t1 and the second intermediate line t2, and provides the second address serving as the target address via the third intermediate line t3 to the forwarding circuit 184 when the second datum is updated. Moreover, the second determination circuit 42 determines whether the second datum is updated by comparing the second datum and a second early datum. The second early datum is received earlier than the second datum.

In an embodiment, the first datum and the second datum are not updated at the same time, or in a single transmission. As such, either the first determination circuit 40 provides the first datum and the first address to the forwarding circuit 184, or the second determination circuit 42 provides the second datum and the second address to the forwarding circuit 184.

Figure 5:
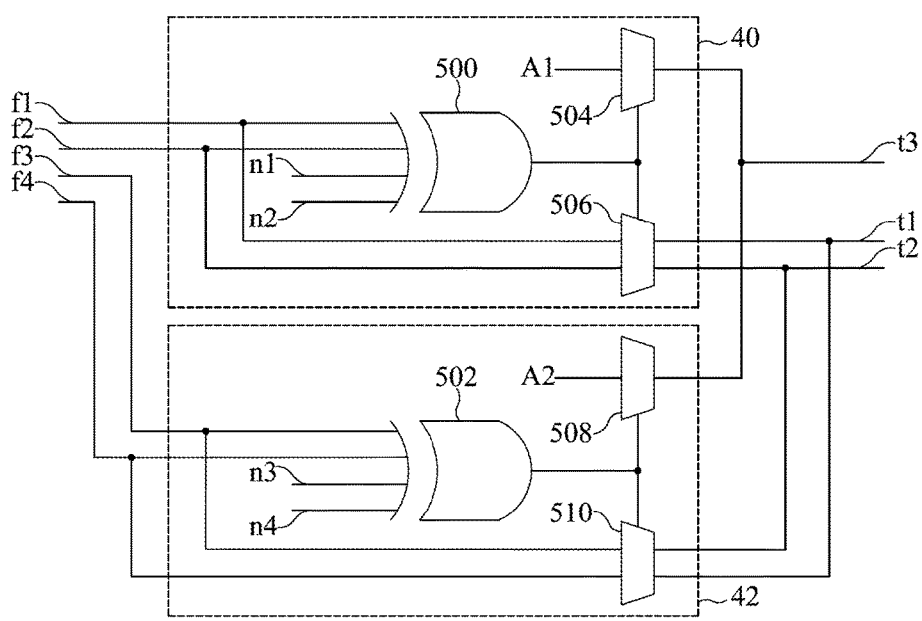
FIG. 5 is a circuit diagram of the first determination circuit and the second determination circuit in FIG. 4 in accordance with some embodiments of the present disclosure.

FIG. 5 is a circuit diagram of the first determination circuit 40 and the second determination circuit 42 in FIG. 4, in accordance with some embodiments of the present disclosure. The first determination circuit 40 includes a first exclusive-or (XOR) logic gate 500, a first multiplexer (MUX) 504 and a second MUX 506. The first XOR logic gate 500 is coupled to the first front line f1 and the second front line f2 at the first XOR logic gate's first and second inputs respectively. Additionally, for receiving the first early datum, the first XOR logic gate 500 is coupled to a first inner line n1 and a second inner line n2 at the first XOR logic gate's third and fourth inputs respectively. A storage device (not shown), such as a latch, latches the first early datum, and provides the first early datum to the first XOR logic gate 500.

The first MUX 504 is coupled to an output of the first XOR logic gate 500 at the first MUX 504's controlled terminal, coupled to the third intermediate line t3 at the first MUX 504's output, and receives the first address A1. The second MUX 506 is coupled to the output of the first XOR logic gate 500 at the second MUX 506's controlled terminal, coupled to the first front line f1 and the second front line f2 at the second MUX 506's first and second inputs respectively, and coupled to the first intermediate line t1 and the second intermediate line t2 at the second MUX 506's first and second outputs respectively.

The second XOR logic gate 502 is coupled to the third front line f3 and the fourth front line f4 at the second XOR logic gate 502's first input and second input respectively. Additionally, for receiving the second early datum, the second XOR logic gate 502 is coupled to a third inner line n3 and a fourth inner line n4 at the second XOR logic gate 502's third and fourth inputs respectively. A storage device (not shown), such as a latch, latches the second early datum, and provides the second early datum to the second XOR logic gate 502.

The third MUX 508 is coupled to an output of the second XOR logic gate 502 at the third MUX 508's controlled terminal, coupled to the third intermediate line t3 at the third MUX 508's output, and receives the second address A2. The fourth MUX 510 is coupled to the output of the second XOR logic gate 502 at the fourth MUX 510's controlled terminal, coupled to the third front line f3 and the fourth front line f4 at the fourth MUX 510's first input and second input respectively, and coupled to the first intermediate line t1 and the second intermediate line t2 at the fourth MUX 510's first output and second output respectively.

In operation, the source circuit 12, via the first front line f1 and the second front line f2, provides the first datum of, for example, 00 to the first XOR logic gate 500, and, via the third front line f3 and the fourth front line f4, provides the second datum of, for example, 00 to the second XOR logic gate 502.

The first XOR logic gate 500 determines that the first datum of 00 is updated by comparing the first datum of 00, and the first early datum of 01 on the inner lines n1 and n2. The first early datum of 01 is received earlier than the first datum of 00. As such, the first XOR logic gate 500 outputs, for example, a logic high to the controlled terminal of each of the first MUX 504 and the second MUX 506. In response to the logic high, the first MUX 504 provides the first address A1 to the forwarding circuit 184 via the third intermediate line t3. In response to the logic high, the second MUX 506 provides the first datum to the forwarding circuit 184 via the first intermediate line t1 and the second intermediate line t2.

The second XOR logic gate 502 determines that the second datum of 00 is not updated by comparing the second datum of 00 with the second early datum of 00 on the inner lines n3 and n4. The second early datum of 00 is received earlier than the second datum of 00. As such, the second XOR logic gate 502 outputs, for example, a logic low to the controlled terminal of each of the third MUX 508 and the fourth MUX 510. In response to the logic low, the third MUX 508 does not provide the second address A2. In response to the logic low, the fourth MUX 510 does not provide the second datum.

Figure 6:
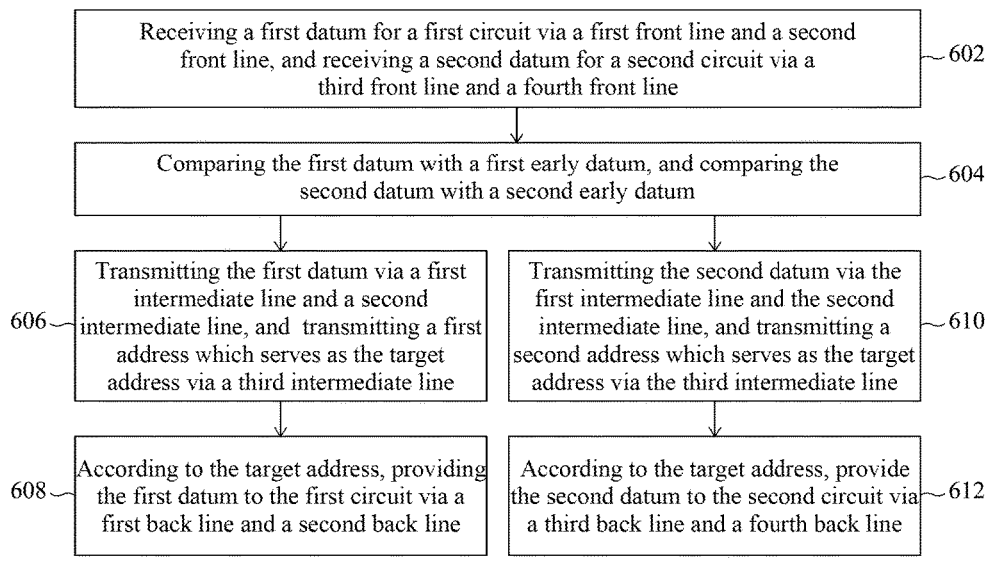
FIG. 6 is a flow chart illustrating a communication method, in accordance with some embodiments of the present disclosure.

FIG. 6 is a flow chart illustrating a communication method 600, in accordance with some embodiments of the present disclosure. Referring to FIG. 6, in operation 602, also referring to FIG. 1, a first datum for a first circuit is received via a first front line and a second front line. Moreover, a second datum for a second circuit is received via a third front line and a fourth front line.

In operation 604, it is determined whether the first datum is updated by comparing the first datum with a first early datum. The first early datum is received earlier than the first datum. Moreover, it is determined whether the second datum is updated by comparing the second datum with a second early datum. The second early datum is received earlier than the second datum. If the first datum is determined as being updated, the method 600 proceeds to operation 606. If the second datum is determined as being updated, the method 600 proceeds to operation 610.

In operation 606, the first datum is transmitted via a first intermediate line and a second intermediate line, and a first address which serves as the target address is transmitted via a third intermediate line.

Subsequent to operation 606, in operation 608, according to the target address, the first datum is provided to the first circuit via a first back line and a second back line.

In operation 610, the second datum is transmitted via the first intermediate line and the second intermediate line, and a second address which serves as the target address is transmitted via the third intermediate line.

In operation 612, according to the target address, the second datum is provided to the second circuit via a third back line and a fourth back line.

Figure 7:
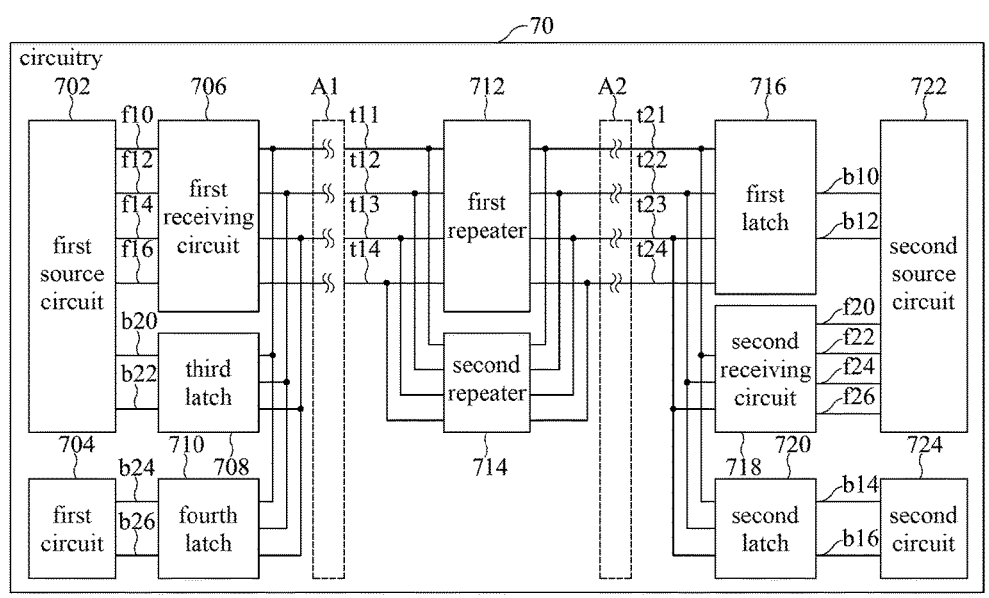
FIG. 7 is a layout diagram of a circuitry in accordance with some embodiments of the present disclosure.

FIG. 7 is a layout diagram of a circuitry 70 in accordance with some embodiments of the present disclosure. Referring to FIG. 7, the circuitry 70 includes a first source circuit 702, a first circuit 704, a first receiving circuit 706, a third latch 708, a fourth latch 710, a first repeater 712, a second repeater 714, a first latch 716, a second receiving circuit 718, a second latch 720, a second source circuit 722 and a second circuit 724.

The circuitry 70 is a bi-directional transmission circuitry. In one directional transmission, the first source circuit 702 functions to transmit a datum to the second source circuit 722 and the second circuit 724. In the other directional transmission, the second source circuit 722 functions to transmit a datum to the first source circuit 702 and the first circuit 704. Because the transmission path either between the first source circuit 702 and both the second source circuit 722 and the second circuit 724, or between the second source circuit 722 and both the first source circuit 702 and the first circuit 704 is quite long, there may occur signal decay on the conductive lines. A repeater, such as the first repeater 712 and the second repeater 714, functions to increase signal strength. In the present disclosure, the repeater supports signal transmission in only one direction. To implement the bi-directional transmission, the first repeater 712 and the second repeater 714 are inversely connected in parallel. Specifically, inputs of the first repeater 712 are coupled to the first receiving circuit 706, and outputs of the first repeater 712 are coupled to the first latch 716 and the second latch 614. In contrast, inputs of the second repeater 714 are coupled to the second receiving circuit 718, and outputs of the second repeater 714 are coupled to the third latch 708 and the fourth latch 710.

The first source circuit 702 functions to transmit a datum to the second source circuit 722 and the second circuit 724. The operation thereof is the same as that in FIG. 3. The second source circuit 722 functions to transmit a datum to the first source circuit and the first circuit. The operation thereof is also the same as that in FIG. 3. Therefore, the detailed description is omitted herein.

The first repeater 712, in response to a first trigger signal on a fourth intermediate line t14 from the first receiving circuit 706, receives one of the first datum and the second datum from the first receiving circuit 706 via a first intermediate line t11 and a second intermediate line t12. In an embodiment, the first trigger signal may come from any circuit other than the first receiving circuit 706.

The first receiving circuit 706 receives from the first source circuit 702 a first datum for the second source circuit 722 via a first front line f10 and a second front line f12, and receives from the first source circuit 702 a second datum for the second circuit 724 via a third front line f14 and a fourth front line f16. The first receiving circuit 706 transmits a target address to the first latch 716 and the second latch 720 via a third intermediate line t13 and a seventh intermediate line t23.

The first latch 716, in response to the first trigger signal, receives the one of the first datum and the second datum from the first repeater 712 via a fifth intermediate line t21 and a sixth intermediate line t22. The first latch 716 transmits the first datum for the second source circuit 722 via conductive lines b10 and b12 when the target address from the first repeater 712 is identical to an address of the second source circuit 722.

The second latch 720, in response to the first trigger signal, receives the one of the first datum and the second datum from the first repeater 712 via the fifth intermediate line t21 and the sixth intermediate line t22. The second latch 720 transmits the second datum for the second circuit 724 via conductive lines b10 and b12 when the target address from the first repeater 712 is identical to an address of the second circuit 724.

The second receiving circuit 718 receives from the second source circuit 722 a third datum for the first source circuit 702 via a first back line f20 and a second back line f22, and receives from the second source circuit 722 a fourth datum for the first circuit 704 via a third back line f24 and a fourth back line f26. The second receiving circuit 718 transmits a target address to the third latch 708 and the fourth latch 710 via the seventh intermediate line t23 and the third intermediate line t13.

The second repeater 714, in response to a second trigger signal different from the first trigger signal on a eighth intermediate line t24 from the second receiving circuit 718, receives one of the third datum and the fourth datum from the second receiving circuit 718 via the fifth intermediate line t21 and the sixth intermediate line t22.

The third latch 708, in response to the second trigger signal, receives the one of the third datum and the fourth datum from the second repeater 714 via the first intermediate line t11 and the second intermediate line t12. The third latch 708 transmits the third datum for the first source circuit 702 via conductive lines b20 and b22 when the target address from the second repeater 714 is identical to an address of the first source circuit 702.

The fourth latch 710, in response to the second trigger signal, receives the one of the third datum and the fourth datum from the second repeater 714 via the first intermediate line t11 and the second intermediate line t12. The fourth latch 710 transmits the fourth datum for the first circuit 704 via conductive lines b24 and b26 when the target address from the second repeater 714 is identical to an address of the first circuit 704.

In operation, the first repeater 712, in response to the first trigger signal, receives the one of the first datum and the second datum and the target address. However, the second repeater 714, in response to the first trigger signal, does not receive the one of the first datum and the second datum, and does not receive the target address from the first receiving circuit 706.

In contrast, the second repeater 714, in response to the second trigger signal, receives the one of the third datum and the fourth datum and the target address from the second receiving circuit 718. However, the first repeater 712, in response to the second trigger signal, does not receive the one of the third datum and the fourth datum, and does not receive the target address from the second receiving circuit 718.

In the bi-directional transmission, with the first receiving circuit 706, the second receiving circuit 718, the first latch 716, the second latch 720, the third latch 708 and the fourth latch 710 of the present disclosure, the number of conductive lines can be significantly decreased. Specifically, each of an area A1 and area A2 of the layout diagram of the circuitry 70 is occupied by only four conductive lines. The number of conductive lines in a transmission path between the circuit and the two or more circuits is reduced by the application of the present disclosure. Such reduction in the number of conductive lines creates additional space between neighboring conductive lines, and signal interference between such neighboring conductive lines is accordingly reduced. Additionally, with the reduced number of conductive lines, size requirements of an integrated circuit are reduced. Alternatively, an integrated circuit with a given area can accommodate more circuits.

Figure 8:
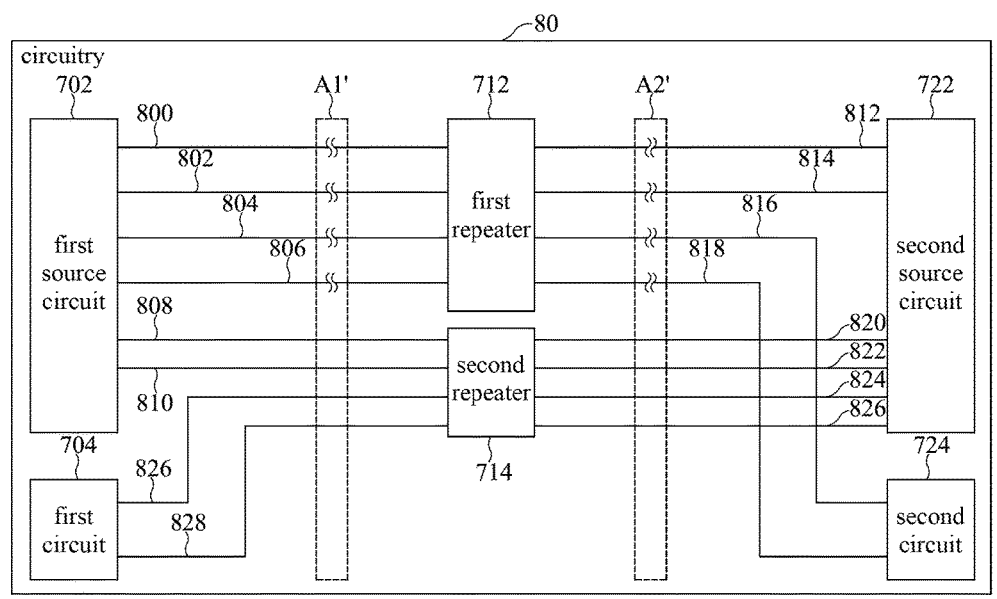
FIG. 8 is a layout diagram of a comparative circuitry.

FIG. 8 is a layout diagram of a comparative circuitry 80. Referring to FIG. 8, the comparative circuitry 80 is similar to the circuitry 70 described and illustrated with reference to FIG. 7 except that, for example, the comparative circuitry 80 omits the first receiving circuit 706, the second receiving circuit 718, the first latch 716, the second latch 720, the third latch 708 and the fourth latch 710 of the present disclosure. The first source circuit 702 transmits a datum for the second source circuit 722 via conductive lines 800 and 802 through the first repeater 712 via conductive lines 812 and 814 to the second source circuit 722. Additionally, the first source circuit 702 transmits a datum for the second circuit 724 via conductive lines 804 and 806 through the first repeater 712 via conductive lines 816 and 818 to the second circuit 724. In contrast, the second source circuit 722 transmits a datum for the first source circuit 702 via conductive lines 820 and 822 through the second repeater 714 via conductive lines 808 and 810 to the first source circuit 702. Moreover, the second source circuit 722 transmits a datum for the first circuit 704 via conductive lines 824 and 826 through the second repeater 714 via conductive lines 826 and 828 to the first circuit 704.

As shown in FIG. 8, each of an area A1' and an area A2' of the layout diagram of the circuitry 80 is occupied by eight conductive lines, well in excess of the four conductive lines that occupy the same area under the application of the present disclosure. Accordingly, in this case, optimal size reduction of the integrated circuit is achieved through application of the present disclosure.

Under the prior technology, a circuit designed to communicate with other circuits requires an excessive number of conductive lines. The present disclosure resolves such disadvantage of the prior art by using the data-distributing circuit to reduce the number of conductive lines. Moreover, the number of conductive lines reduced by the present disclosure is greater for circuits that communicate with greater numbers of other circuits. For example, a source circuit that communicates with two other circuits would require at least one fewer conductive line under the present disclosure than would be required under the prior technology.

A reduction in the number of conductive lines creates additional space between neighboring conductive lines, and signal interference between such neighboring conductive lines is accordingly reduced. Additionally, with the reduced number of conductive lines, size requirements of integrated circuits are reduced as well. Alternatively, an integrated circuit with a particular area can accommodate more circuits under the present disclosure. In an embodiment in which the first datum and/or the second datum requires at least two bits representing a bit string (and therefore at least two state lines) to represent the content of the first datum and/or the second datum, the number of conductive lines is significantly reduced.

Some embodiments have one or a combination of the following features and/or advantages. In some embodiments, a circuitry is provided. The circuitry includes a source circuit, a first circuit, a second circuit and a data-distributing circuit. The data-distributing circuit includes a receiving circuit and a forwarding circuit. The receiving circuit is configured to receive from the source circuit a first datum for the first circuit via a first front line and a second front line, and to receive from the source circuit a second datum for the second circuit via a third front line and a fourth front line. The forwarding circuit is configured to receive one of the first datum and the second datum via a first intermediate line and a second intermediate line, to receive a target address associated with the one of the first datum and the second datum via a third intermediate line. The forwarding circuit is configured to, according to the target address, provide the one of the first datum and the second datum to one of the first circuit and the second circuit.

In some embodiments, a circuitry is provided. The circuitry includes a source circuit, a first circuit, a second circuit, and a data-distributing circuit. The data-distributing circuit includes a receiving circuit and a forwarding circuit. The receiving circuit is configured to receive from the source circuit a first datum for the first circuit via a first front line and a second front line, to receive from the source circuit a second datum for the second circuit via a third front line and a fourth front line, to connect the first front line and the second front line to a first intermediate line and a second intermediate line respectively when the first datum is updated, and to connect the third front line and the fourth front line to the first and second intermediate lines respectively when the second datum is updated. The forwarding circuit is configured to receive, via the first intermediate line and the second intermediate line, the first datum when the first front line and the second front line are connected to the first and second intermediate lines respectively, and to receive, via the first intermediate line and the second intermediate line, the second datum when the third front line and the fourth front line are connected to the first and second intermediate lines respectively.

In some embodiments, a circuitry is provided. The circuitry includes a first source circuit, a second source circuit, a first circuit, a second circuit, a first repeater, a second repeater, a first latch, a second latch, a third latch, a fourth latch, a first receiving circuit and a second receiving circuit. The first receiving circuit is configured to receive from the first source circuit a first datum for the second source circuit via a first front line and a second front line, and to receive from the first source circuit a second datum for the second circuit via a third front line and a fourth front line. The first repeater is configured to, in response to a first trigger signal, receive one of the first datum and the second datum from the first receiving circuit via a first intermediate line and a second intermediate line. The first latch is configured to, in response to the first trigger signal, receive the one of the first datum and the second datum from the first repeater via a fifth intermediate line and a sixth intermediate line. The second latch is configured to, in response to the first trigger signal, receive the one of the first datum and the second datum from the first repeater via the fifth intermediate line and the sixth intermediate line. The second receiving circuit is configured to receive from the second source circuit a third datum for the first source circuit via a first back line and a second back line, and receive from the second source circuit a fourth datum for the first circuit via a third back line and a fourth back line. The second repeater is configured to, in response to a second trigger signal different from the first trigger signal, receive one of the third datum and the fourth datum from the second receiving circuit via the fifth intermediate line and the sixth intermediate line. The third latch is configured to, in response to the second trigger signal, receive the one of the third datum and the fourth datum from the second repeater via the first intermediate line and the second intermediate line. The fourth latch is configured to, in response to the second trigger signal, receive the one of the third datum and the fourth datum from the second repeater via the first intermediate line and the second intermediate line.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A circuitry, comprising:
    a source circuit;
    a first circuit;
    a second circuit; and
    a data-distributing circuit, including:
        a receiving circuit configured to receive from the source circuit a first datum for the first circuit via a first front line and a second front line, and to receive from the source circuit a second datum for the second circuit via a third front line and a fourth front line; and
    a forwarding circuit configured to receive one of the first datum and the second datum via a first intermediate line and a second intermediate line, to receive a target address associated with the one of the first datum and the second datum via a third intermediate line, and, according to the target address, provide the one of the first datum and the second datum to one of the first circuit and the second circuit,
    wherein the forwarding circuit configured to provide the one of the first datum and the second datum to the one of the first circuit and the second circuit further comprises: the forwarding circuit configured to either provide the first datum via a first back line and a second back line to the first circuit, or to provide the second datum to the second circuit via a third back line and a fourth back line.

2. The circuitry of claim 1, wherein the forwarding circuit comprises:
    a first latch configured to provide the first datum to the first circuit when the target address is identical to a first address of the first circuit; and
    a second latch configured to provide the second datum to the second circuit when the target address is identical to a second address of the second circuit.

3. The circuitry of claim 2, wherein the first latch configured to provide the first datum to the first circuit when the target address is identical to the first address comprises: the first latch configured to provide the first datum to the first circuit via the first back line and the second back line; and
    wherein the second latch configured to provide the second datum to the second circuit when the target address is identical to the second address comprises: the second latch configured to provide the second datum to the second circuit via the third back line and the fourth back line.

4. The circuitry of claim 2, wherein both the first latch and the second latch receive the one of the first datum and the second datum via the first intermediate line and the second intermediate line.

5. The circuitry of claim 4, wherein both the first latch and the second latch receive the target address via the third intermediate line.

6. The circuitry of claim 1, wherein the receiving circuit comprises:
    a first determination circuit configured to provide the first datum and the first address which serves as the target address to the forwarding circuit when the first datum is updated; and
    a second determination circuit configured to provide the second datum and the second address which serves as the target address to the forwarding circuit when the second datum is updated.

7. The circuitry of claim 6,
    wherein the first determination circuit is further configured to determine whether the first datum is updated by comparing the first datum and an first early datum, wherein the first early datum is received earlier than the first datum, and
    wherein the second determination circuit is further configured to determine whether the second datum is updated by comparing the second datum and an second early datum, wherein the second early datum is received earlier than the second datum.

8. The circuitry of claim 7, wherein the first determination circuit comprises:
- a first exclusive-or (XOR) logic gate coupled to the first front line and the second front line for receiving the first datum, and coupled to a first inner line and a second inner line for receiving the first early datum;
- a first multiplexer (MUX) coupled to an output of the first XOR logic gate at the first MUX's controlled terminal and coupled to the third intermediate line at the first MUX's output, and configured to receive the first address; and
- a second MUX coupled to the output of the first XOR logic gate at the second MUX's controlled terminal, coupled to the first front line and the second front line at the second MUX's first and second inputs respectively, and coupled to the first intermediate line and the second intermediate line at the second MUX's first and second outputs respectively.

9. The circuitry of claim 8, wherein the second determination circuit comprises:
- a second exclusive-or (XOR) logic gate coupled to the third front line and the fourth front line for receiving the second datum, and coupled to a third inner line and a fourth inner line for receiving the second early datum;
- a third MUX coupled to an output of the second XOR logic gate at the third MUX's controlled terminal and coupled to the third intermediate line at the third MUX's output, and configured to receive the second address; and
- a fourth MUX coupled to the output of the second XOR logic gate at the fourth MUX's controlled terminal, coupled to the third front line and the fourth front line at the fourth MUX's first and second inputs respectively, and coupled to the first intermediate line and the second intermediate line at the fourth MUX's first and second outputs respectively.

10. A circuitry, comprising:
- a source circuit;
- a first circuit;
- a second circuit; and
- a data-distributing circuit including:
- a receiving circuit configured to receive from the source circuit a first datum for the first circuit via a first front line and a second front line, to receive from the source circuit a second datum for the second circuit via a third front line and a fourth front line, to connect the first front line and the second front line to a first intermediate line and a second intermediate line respectively when the first datum is updated, and to connect the third front line and the fourth front line to the first intermediate line and the second intermediate line respectively when the second datum is updated; and
- a forwarding circuit configured to receive, via the first intermediate line and the second intermediate line, the first datum when the first front line and the second front line are connected to the first intermediate line and the second intermediate line respectively, and to receive, via the first intermediate line and the second intermediate line, the second datum when the third front line and the fourth front line are connected to the first intermediate line and the second intermediate line respectively.

11. The circuitry of claim 10, wherein the forwarding circuit is further configured to receive, via a third intermediate line between the receiving circuit and the forwarding circuit, a target address, wherein the target address is a first address of the first circuit when the first datum is updated, and the target address is a second address of the second circuit when the second datum is updated.

12. The circuitry of claim 11, wherein the forwarding circuit is further configured to, according to the first address, provide the first datum to the first circuit, and configured to, according to the second address, provide the second datum to the second circuit.

13. The circuitry of claim 12, wherein the forwarding circuit is configured to provide the first datum to the first circuit via a first back line and a second back line to the first circuit, and to provide the second datum to the second circuit via a third back line and a fourth back line.

14. The circuitry of claim 11, wherein the forwarding circuit comprises:
- a first latch configured to store the first address of the first circuit, and to provide the first datum to the first circuit when the target address is identical to the first address; and
- a second latch configured to store the second address of the second circuit, and to provide the second datum to the second circuit when the target address is identical to the second address.

15. The circuitry of claim 14, wherein both the first latch and the second latch receive the one of the first datum and the second datum via the first intermediate line and the second intermediate line.

16. The circuitry of claim 15, wherein both the first latch and the second latch receive the target address via the third intermediate line.

17. The circuitry of claim 10, wherein the receiving circuit comprises:
- a first determination circuit configured to provide the first datum and the first address which serves as the target address to the forwarding circuit when the first datum is updated; and
- a second determination circuit configured to provide the second datum and the second address which serves as the target address to the forwarding circuit when the second datum is updated.

18. The circuitry of claim 17,
wherein the first determination circuit is further configured to determine whether the first datum is updated by comparing the first datum and an first early datum, wherein the first early datum is received earlier than the first datum, and
wherein the second determination circuit is further configured to determine whether the second datum is updated by comparing the second datum and an second early datum, wherein the second early datum is received earlier than the second datum.

19. A circuitry, comprising:
- a first source circuit;
- a second source circuit;
- a first circuit;
- a second circuit;
- a first receiving circuit configured to receive from the first source circuit a first datum for the second source circuit via a first front line and a second front line, and to receive from the first source circuit a second datum for the second circuit via a third front line and a fourth front line;
- a first repeater configured to, in response to a first trigger signal, receive one of the first datum and the second datum from the first receiving circuit via a first intermediate line and a second intermediate line;
- a first latch configured to, in response to the first trigger signal, receive the one of the first datum and the second datum from the first repeater via a fifth intermediate line and a sixth intermediate line;

a second latch configured to, in response to the first trigger signal, receive the one of the first datum and the second datum from the first repeater via the fifth intermediate line and the sixth intermediate line;

a second receiving circuit configured to receive from the second source circuit a third datum for the first source circuit via a first back line and a second back line, and to receive from the second source circuit a fourth datum for the first circuit via a third back line and a fourth back line;

a second repeater configured to, in response to a second trigger signal different from the first trigger signal, receive one of the third datum and the fourth datum from the second receiving circuit via the fifth intermediate line and the sixth intermediate line;

a third latch configured to, in response to the second trigger signal, receive the one of the third datum and the fourth datum from the second repeater via the first intermediate line and the second intermediate line; and a fourth latch configured to, in response to the second trigger signal, receive the one of the third datum and the fourth datum from the second repeater via the first intermediate line and the second intermediate line.

* * * * *